US010254713B2

(12) United States Patent
Lin

(10) Patent No.: US 10,254,713 B2
(45) Date of Patent: Apr. 9, 2019

(54) HOLOGRAPHIC IMAGE RECORDING AND RECONSTRUCTING METHOD

(71) Applicant: INN VALLEY TECHNOLOGY INC., Grand Cayman (KY)

(72) Inventor: Chih-Hsiung Lin, New Taipei (TW)

(73) Assignee: G.T. GROUP CORP., Apia (WS)

( * ) Notice: Subject to any disclaimer, the term of this patent is extended or adjusted under 35 U.S.C. 154(b) by 296 days.

(21) Appl. No.: 15/114,315

(22) PCT Filed: Dec. 29, 2014

(86) PCT No.: PCT/CN2014/001190
§ 371 (c)(1),
(2) Date: Jul. 26, 2016

(87) PCT Pub. No.: WO2016/106471
PCT Pub. Date: Jul. 7, 2016

(65) Prior Publication Data
US 2017/0003652 A1    Jan. 5, 2017

(51) Int. Cl.
*G03H 1/04* (2006.01)
*G03H 1/14* (2006.01)
(Continued)

(52) U.S. Cl.
CPC .............. *G03H 1/14* (2013.01); *G03H 1/041* (2013.01); *G03H 1/0465* (2013.01);
(Continued)

(58) Field of Classification Search
CPC ............ G03H 1/14; G03H 1/28; G03H 1/268; G03H 1/2202; G03H 1/0465;
(Continued)

(56) References Cited

U.S. PATENT DOCUMENTS 4,645,291 A * 2/1987 McCrickerd ............. G03H 1/04
359/30
2009/0147072 A1* 6/2009 Brotherton-Ratcliffe .....................
G03H 1/268
348/40
(Continued)

OTHER PUBLICATIONS

Koek et al. (Holographic simultaneous readout polarization multiplexing based on photoinduced anisotropy in bateriorhodopsin, Optics Letters vol. 29, No. 1, pp. 101-103, Jan. 2004) (Year: 2004).*

*Primary Examiner* — Kimberly N. Kakalec
(74) *Attorney, Agent, or Firm* — Chun-Ming Shih

(57) ABSTRACT

A holographic image recording method is disclosed, that is realized through utilizing a holographic image fetching and recording device, including the following steps: using an image fetching device to fetch an image of a target object placed on a rotation table rotating at a fixed speed, the image thus obtained is transmitted to a display panel through a connection line; using a light emitting unit to emit coherent light to a first reflector; that reflects the coherent light to light splitter; and the light splitter splits the coherent light along a first light path and a second light path into an object light and a reference light, and transmits them onto a holographic film to interfere with each other, to form a holographic image. A holographic image reconstructing method is also disclosed, to reconstruct and form a 3D holographic image floating above the holographic film.

5 Claims, 5 Drawing Sheets

(51) Int. Cl.
*G03H 1/22* (2006.01)
*G03H 1/26* (2006.01)
*G03H 1/28* (2006.01)

(52) U.S. Cl.
CPC ......... *G03H 1/2202* (2013.01); *G03H 1/2286* (2013.01); *G03H 1/268* (2013.01); *G03H 1/28* (2013.01); *G03H 2001/0426* (2013.01); *G03H 2001/0428* (2013.01); *G03H 2001/0471* (2013.01); *G03H 2001/2234* (2013.01); *G03H 2001/267* (2013.01); *G03H 2001/2695* (2013.01); *G03H 2210/22* (2013.01); *G03H 2210/42* (2013.01); *G03H 2222/31* (2013.01); *G03H 2223/22* (2013.01); *G03H 2227/03* (2013.01)

(58) Field of Classification Search
CPC ................. G03H 1/2286; G03H 1/041; G03H 2001/2695; G03H 2222/31; G03H 2210/42; G03H 2223/22; G03H 2227/03; G03H 2210/22; G03H 2001/267; G03H 2001/0426; G03H 2001/0471; G03H 2001/0428; G03H 2001/2234; G03H 2001/0216
See application file for complete search history.

(56) References Cited

U.S. PATENT DOCUMENTS

2012/0212789 A1* 8/2012 Shirakura ............ G03H 1/0011
359/2
2013/0271802 A1* 10/2013 Yao ........................ G03H 1/24
359/10

* cited by examiner

HOLOGRAPHIC IMAGE RECORDING AND RECONSTRUCTING METHOD

BACKGROUND OF THE INVENTION

Field of the Invention

The present invention relates to an image recording and reconstructing method, and in particular to a holographic image recording and reconstructing method.

The Prior Arts

In general, the basic principle of producing a holographic film is as follows: firstly, using an image fetching device, such as a charge-coupled device (CCD) camera, to fetch images of an object placed on an object table. Meanwhile, using a light emitting device, such as a Laser, to emit a coherent light to a light splitting module, which splits the light into an object light and a reference light. Wherein, the object light travels along an object light path, to transmit the image fetched by the image fetching device onto a holographic film. In addition, the reference light travels along a reference light path, and is reflected onto the holographic film. Then, the object light and the reference light arrive on the holographic film at the same time to interfere with each other, hereby generating a plurality of dark and bright interference fringes. Then the holographic film thus obtained is developed into a composite holographic film having images of an object recorded thereon. For which, a reference light can be used as reconstruction light to irradiate thereon, to reconstruct a 3D image of the object.

The conventional composite hologram includes cylinder type composite hologram and cone type composite hologram. For which, in recording images or in reconstructing images, the holographic film has to be bent into cylinder shape or cone shape. Therefore, the images thus reconstructed will have distortion and is not satisfying. To redress this problem, a disc type composite hologram is proposed. Yet, regardless the cylinder, cone, or disc type composite hologram, a cylindrical lens has to be used. The composite holographic film thus produced is of a long and narrow sector shape, while the reconstructed image is formed by combining the reconstructed images of a plurality of small composite holographic films, therefore, it is liable to have aberration. Further, on the reconstructed image is overlapped a plurality of gratings, referred to as grating effect, so the quality of the image is inferior.

Moreover, even if a disc type composite hologram is used, since in recording an image, repeated exposures are required, such that the luminance of the reconstructed image is insufficient and it can not be viewed clearly, thus size of the reconstructed image can not be made sufficiently small (for example, to be used as an anti-counterfeiting tag), as such its application is rather limited. Therefore, the image produced by the disc type composite hologram is still not satisfying.

Therefore, presently, the design and performance of holographic image recording and reconstructing method is not quite satisfactory, and it leaves much room for improvement.

SUMMARY OF THE INVENTION

In view of the problems and drawbacks of the prior art, the present invention provides a holographic image recording and reconstructing method, to overcome the shortcomings of the prior art.

The major objective of the present invention is to provide a holographic image recording and reconstructing method. Wherein, two optical polarizers are placed in a light path, to remove image distortion and grating, and to record more precisely holographic images on a holographic film. As such, it can not only reduce the size of the holographic film utilized, but it can also produce reconstructed images of larger size, and raise the luminance of the reconstructed image, thus improving the quality and view-ability of the image significantly.

The present invention provides a holographic image recording and reconstructing method. In which, when a target object is rotating on a rotation table, and an image fetching device is aimed at the rotating target object to take its images of 360 degrees, and transmits them to a liquid crystal display. At the same time, since two optical polarizers are placed in a light path, such that between each exposure of light, the polarizing directions of the object light and the reference light are rotated a small angle, and the fetched image is recorded repeatedly on the holographic film, until all the object images of 360 degrees are recorded on the holographic film, to complete the image fetching and recording for the holographic images of the target object.

The present invention provides a holographic image recording method, that is realized through utilizing a holographic image fetching and recording device, including a holographic image fetching device and a holographic image recording device. Wherein, the holographic image fetching device includes an image fetching device and a rotation table. The holographic image recording device includes: a light emitting unit, a first reflector, a light splitter, a first polarizer, a second reflector, a display panel, a holographic film, a second polarizer, and a third reflector. The holographic image recording method includes the following steps: firstly, using an image fetching device itself remaining fixed, to fetch images of a target object placed on a rotation table rotating at a fixed speed, the image thus obtained is transmitted to a display panel through a connection line. Next, using a light emitting unit, to emit a coherent light to a first reflector. Then, the first reflector receives the coherent light and reflects it to a light splitter. Subsequently, the light splitter reflects the coherent light along a second light path (reference light path) to the second polarizer (to become a reference light). Then, the second polarizer polarizes the coherent light into a polarized light, and transmits it to the third reflector. Afterwards, the third reflector reflects the polarized light onto the holographic film along the second light path. At the same time, the light splitter transmits the coherent light along the first light path (object light path) to the first polarizer (to become an object light). Then, first polarizer polarizes the coherent light into a polarized light, and transmits it to the second reflector. Subsequently, the second reflector reflects the polarized light onto the display panel along the first light path, and then transmits the polarized light through the display panel, with the polarized light carrying the image information on the display panel, to impinge onto the holographic film. And finally, on the holographic film, the object light coming from the first light path, and the reference light coming from the second light path interfere with each other, to form a holographic image.

In addition, the present invention provides a holographic image reconstructing method, and that is realized through a holographic image reconstructing device, which includes a light bulb and a polarizer. The polarizer is disposed between the light bulb and a holographic film, while on the holographic film is provided with the recorded holographic images. The holographic image reconstructing method includes the following steps: using the light bulb to emit light to irradiate it onto the holographic film from below after passing through the polarizer. Then, rotating the polarizer at fixed speed, to polarize the light coming from the light bulb, to change the polarization angle of that light. And finally, using the polarized light having changing polarization angle, to irradiate it onto the holographic film, hereby reconstructing the holographic image of the target object.

In the present invention, the holographic image recorded at various angles can be reconstructed as above, so that an enlarged 2 dimensional (2D) image will appear to float above the holographic film. Due to vision persistence of the human eyes, in the brain of the surrounding viewers, the enlarged and floating 2D holographic image is perceived as a 3D holographic image.

The advantage of the present invention is that, object light and reference light of the same polarization angle are irradiated onto the holographic film at the same time, to form holographic film of smaller size (less than 1 cm×1 cm). In addition, since polarizer is used in the image formation route, the cylinder lens utilized in the conventional disc type composite hologram can be eliminated, so image distortion will not occur, while fringe effect can be eliminated. Further, in reconstructing image, a floated and enlarged 2D image will appear at higher altitude, to provide images of 360 degrees to the viewers around.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from the detailed descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed descriptions with reference to the attached drawings.

Figure 1:
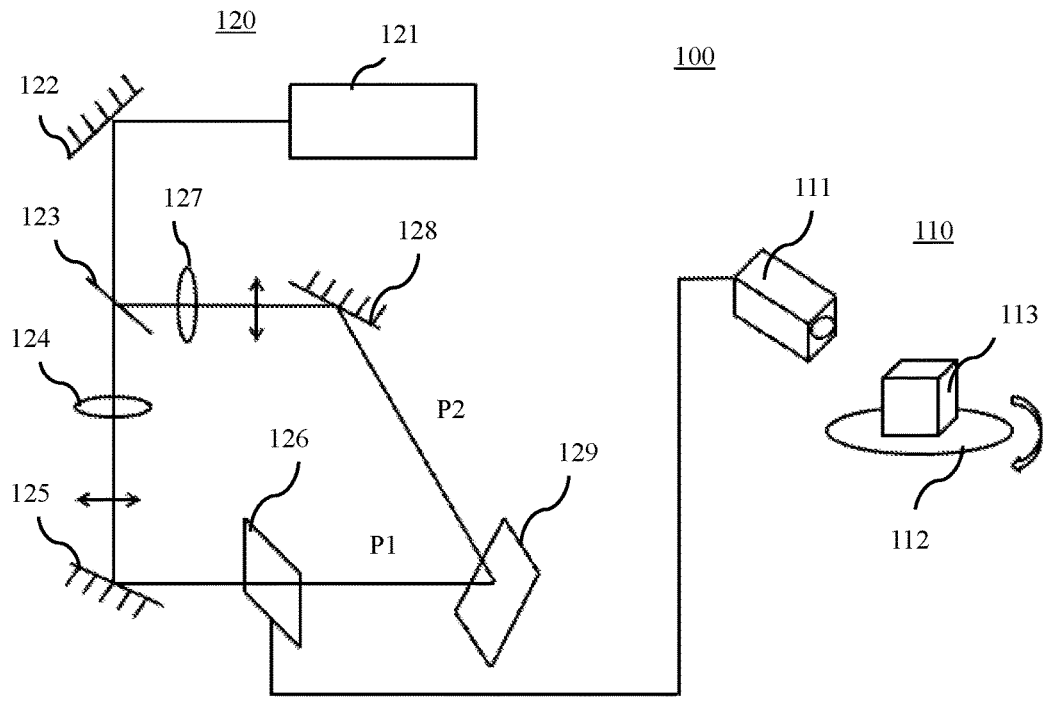
FIG. 1 is a schematic diagram of a holographic image fetching and recording device utilized in implementing a holographic image recording method according to an embodiment of the present invention.

Refer to FIG. 1 for a schematic diagram of a holographic image fetching and recording device utilized in implementing a holographic image recording method according to an embodiment of the present invention. In other words, the present invention provides a holographic image recording method and a holographic image reconstructing method, that are realized through using the holographic image fetching and recording device 100, including a holographic image fetching device 110 and a holographic image recording device 120. Wherein, the holographic image fetching device 110 includes an image fetching device 111 and a rotation table 112. The holographic image recording device 120 includes: a light emitting unit 121, a first reflector 122, a light splitter 123, a first polarizer 124, a second reflector 125, a display panel 126, a holographic film 129, a second polarizer 127, and a third reflector 128.

In the present invention, the holographic image fetching and recording device 100 is applicable to various holographic image recording systems, such as it can be used to record holographic image on a rainbow holographic film, a reflective type holographic film, a multi-angle holographic film, a true color holographic film, or an integrated holographic film. However, the present invention is not limited to this.

In implementing the holographic image recording method of the present invention, firstly, a target object 113 is placed on a rotation table 112 to rotate 360 degrees at a set speed, the image fetching device 111 remains fixed to aim at the target object 113. Therefore, when the rotation table 112 rotates 360 degrees at fixed speed, the image fetching device 111 is able to take images of the target object 113 of 360 degrees, while the image is transmitted to a display panel 126 and displayed thereon through a connection line. In the meantime, the light emitting unit 121 emits coherent light to the first reflector 122, which receives the coherent light and reflects it to the light splitter 123, that reflects part of the coherent light to the second polarizer 127 as the reference light. The second polarizer 127 polarizes the reference light into polarized light and transmits it to the third reflector 128, which reflects the polarized light to the holographic film 129. As described above, the optical path from the light splitter 123 to the third reflector 128, and then to the holographic film 129, is referred to as the second light path P2 (also referred to as reference light path), having a length d2.

In the present embodiment, when the splitter 123 reflects the coherent light to the second polarizer 127, at the same time the splitter 123 transmits the coherent light to the first polarizer 124. After the coherent light is polarized into polarized light, it is transmitted to the second reflector 125, that reflects the polarized light to the display panel 126. Then, the polarized light is transmitted through the display panel 126, with the polarized light carrying the image information on the display panel 126, to impinge onto the holographic film 129, to interfere with the reference light to form into a holographic image. As described above, the optical path from the light splitter 123 through the second reflector 125, and then to the holographic film 129, is referred to as the first light path P1 (also referred to as object light path), having a length d1.

In the descriptions above, the first polarizer 124 and the second polarizer 127 can each be driven by a step motor (not shown), to rotate at the same angular velocity. In addition, the length d2 of the reference light path P2 from the light splitter 123 to the holographic film 129, is the same as the length d1 of the object light path P1 from the light splitter 123 to the holographic film 129.

In the present embodiment, the light emitting unit 121 can be one of the following: a gas laser, a carbon dioxide laser, a liquid state laser, a solid state laser, and a semiconductor laser, but the present invention is not limited to this. Moreover, in the present embodiment, the coherent light can be a visible light or a non-visible light; the image fetching device 111 can be a CCD camera. In addition, the display panel 126 can be a liquid crystal display panel.

Figure 2A:
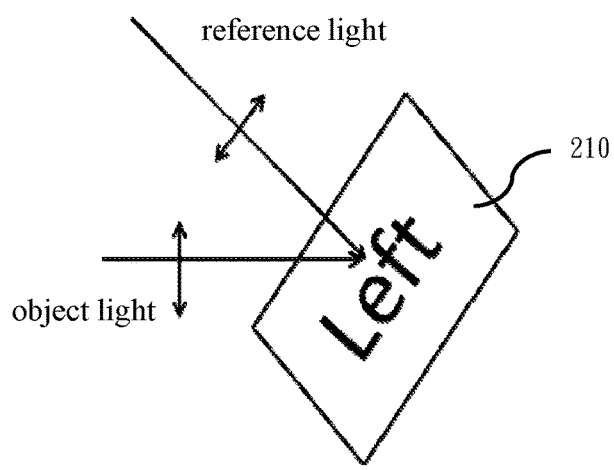
FIGS. 2(a), 2(b), and 2(c) are schematic diagrams of using polarized object light and polarized reference light to record hologram images onto the holographic film according to an embodiment of the present invention.
Figure 2B:
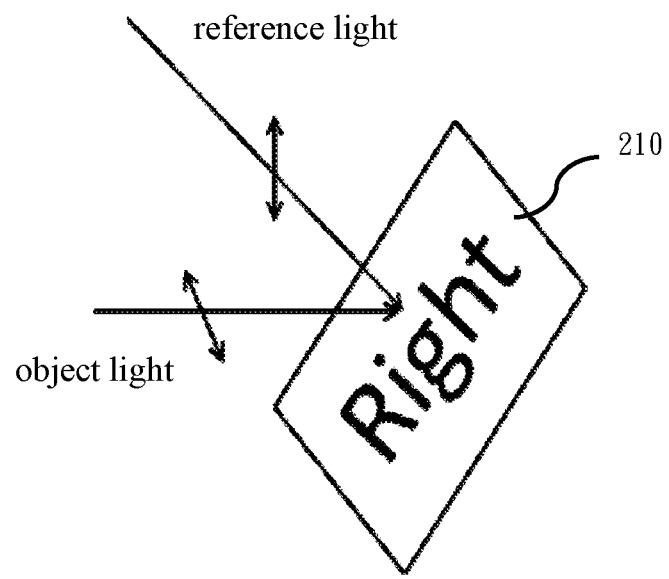
Figure 2C:
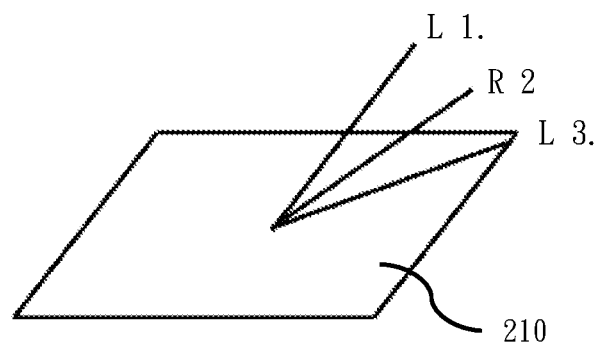

Then, refer to FIGS. 2(a), 2(b), and 2(c) respectively for schematic diagrams of using polarized object light and polarized reference light to record hologram images onto the holographic film according to an embodiment of the present invention. As shown in FIG. 2(a), the first polarizer 124 and the second polarizer 127 of FIG. 1 is driven respectively by step motors to rotate synchronously at the same angular velocity, when the polarization angles of the polarized object light and the polarized reference light polarized by the two polarizers are both at 1°, the two lights arrive at the holographic films 210 to produce interference fringes, to form holographic images to be recorded on the holographic film 210, hereby recording the image taken by the image fetching device 111 when the target object 113 is rotated at 1° (namely, on the left side). Then, as shown in FIG. 2(b), in the same approach, when the polarization angles of the polarized object light and the polarized reference light polarized by the first polarizer 124 and the second polarizer 127 are both at 2°, the two lights arrive at the holographic films 210 to produce interference fringes, to form holographic images to be recorded on the holographic film 210, hereby recording the image taken by the image fetching device 111 when the target object 113 is rotated at 2° (namely, on the right side). Further, as shown in FIG. 2(c), as described above, L1 indicates that when the polarization angles of the polarized object light and the polarized reference light are both at 1°, on the holographic film 210 at L1 is recorded the image of the left side of the target object 113. R2 indicates that when the polarization angles of the polarized object light and the polarized reference light are both at 2°, on the holographic film 210 at R2 is recorded the image of the right side of the target object 113. L3 indicates that when the polarization angles of the polarized object light and the polarized reference light are both at 3°, on the holographic film 210 at L3 is recorded the image of the left side of the target object 113. Therefore, between each exposure of lights, the polarization angle of the polarized object light and the polarized reference light is rotated a small angle. As such, the target object 113 is exposed to lights repeatedly, while images are recorded on the holographic film 210, until all the images of 360° for the target object 113 are recorded onto the holographic film 210, to complete the image fetching and recording for the holographic images of the target object 113.

Figure 3:
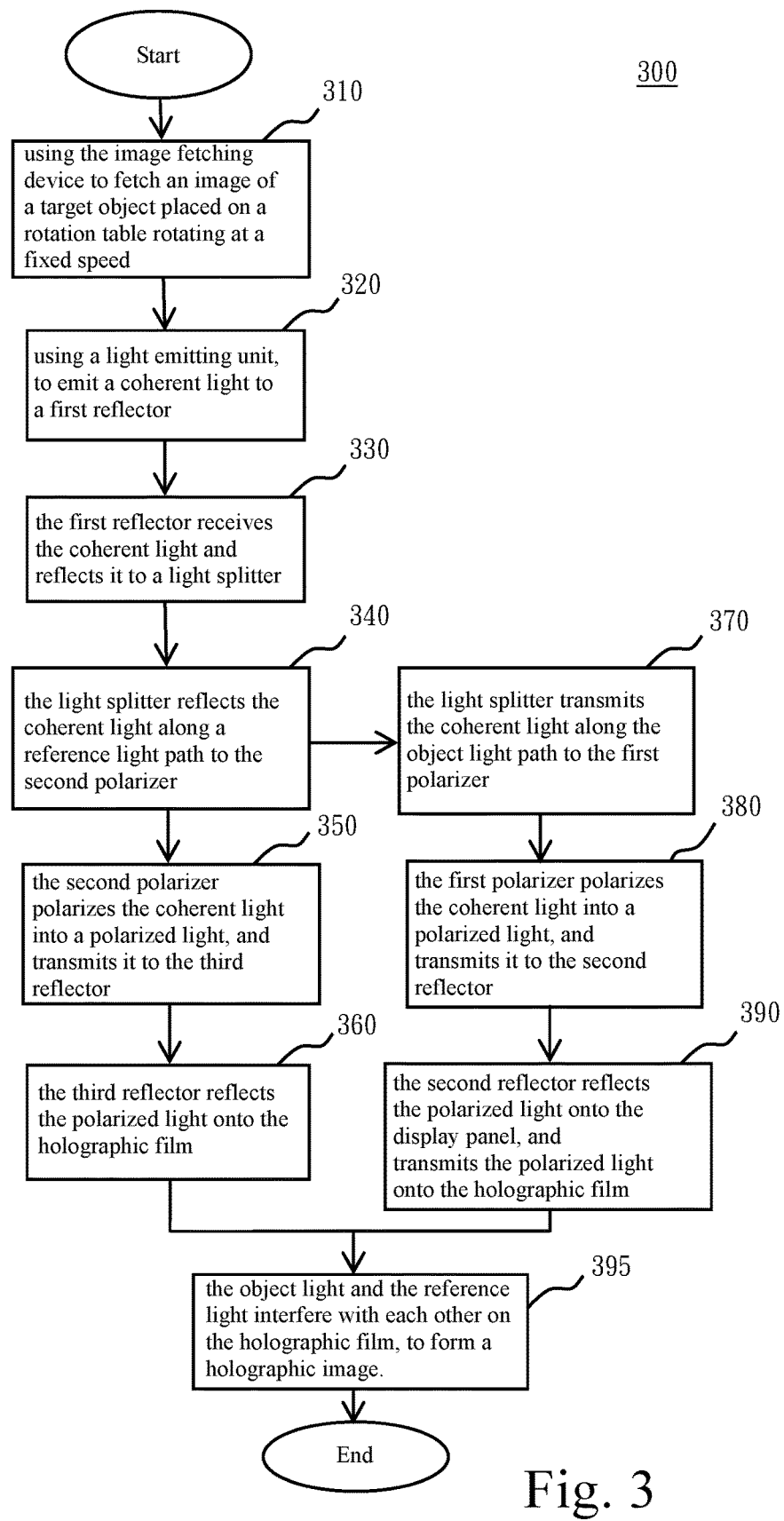
FIG. 3 is a flowchart of the steps of a holographic image recording method according to an embodiment of the present invention.

Subsequently, refer to FIG. 3 for a flowchart of the steps of a holographic image recording method according to an embodiment of the present invention. As shown in FIG. 3, the holographic image recording method is realized through using a holographic image fetching and recording device 100, including a holographic image fetching device 110, that includes an image fetching device 111 and a rotation table 120; and a holographic image recording device 120, that includes a light emitting unit 121, a first reflector 122, a light splitter 123, a first polarizer 124, a second reflector 125, a display panel 126, a holographic film 129, a second polarizer 127, and a third reflector 128.

The holographic image recording method includes the following steps: firstly, using an image fetching device 111 itself remaining fixed, to fetch images of a target object 113 placed on a rotation table 112 rotating at a fixed speed, the image thus obtained is transmitted to a display panel 126 through a connection line (step 310); next, using a light emitting unit 121, to emit a coherent light to a first reflector 122 (step 320); then, the first reflector 122 receives the coherent light and reflects it to a light splitter 123 (step 330); subsequently, the light splitter 123 reflects the coherent light along a second light path P2 (reference light path) to the second polarizer 127 (to become a reference light) (step 340); then, the second polarizer 127 polarizes the coherent light into a polarized light, and transmits it to the third reflector 128 (step 350); afterwards, the third reflector 128 reflects the polarized light onto the holographic film 129 along the second light path P2 (step 360); at the same time, the light splitter 123 transmits the coherent light along the first light path P1 (object light path) to the first polarizer 124 (to become an object light) (step 370); then, first polarizer 124 polarizes the coherent light into a polarized light, and transmits it to the second reflector 125 (step 380); subsequently, the second reflector 125 reflects the polarized light onto the display panel 126 along the first light path P1, and then transmits the polarized light through the display panel 126, with the polarized light carrying the image information of the display panel 126, to impinge onto the holographic film 129 (step 390); and finally, on the holographic film 129, the object light coming from the first light path P1, and the reference light coming from the second light path P2 interfere with each other, to form a holographic image (step 395).

In the descriptions above, the first polarizer 124 and the second polarizer 127 are driven by motor (not shown) to rotate synchronously for 360° at the same speed. The lengths of the first light path P1 and the second light path P2 are equal. The rotation table 112 is driven by a motor to rotate 360°.

Figure 4A:
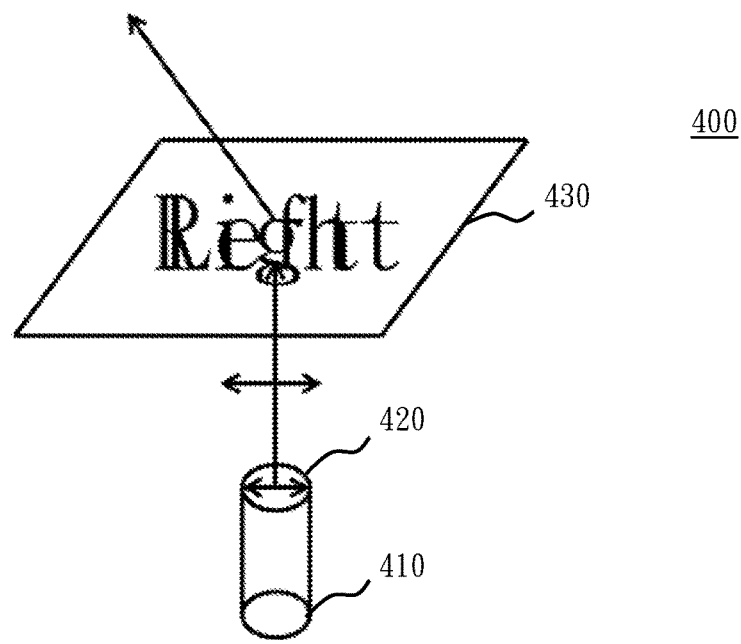
FIGS. 4(a), 4(b), and 4(c) are schematic diagrams of using a holographic image reconstructing device to reconstruct holographic images recorded on the holographic film according to an embodiment of the present invention.
Figure 4B:
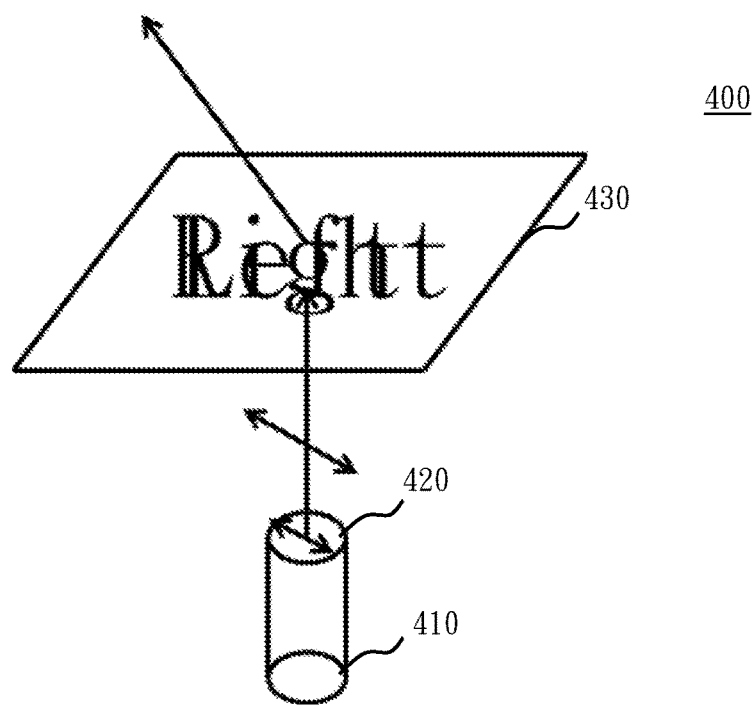
Figure 4C:
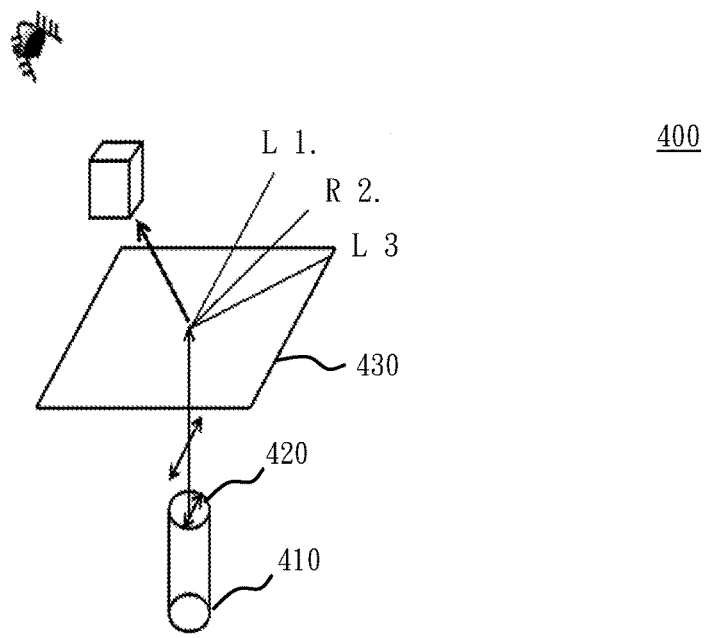

The present invention also provides a holographic image reconstructing method. Refer to FIGS. 4(a), 4(b), and 4(c) for schematic diagrams of using a holographic image reconstructing device to reconstruct holographic images recorded on the holographic film according to an embodiment of the present invention. As shown in FIG. 4(a), the holographic image reconstructing device 400 includes: a light bulb 410, that can be an LED light; and a polarizer 420 disposed between the light bulb 410 and a holographic film 430, while on the holographic film 430 is provided with the recorded holographic images. In operations, the holographic image reconstructing method is implemented as follows: using the light bulb 410 to emit light to irradiate it onto the holographic film 430 from below after passing through the polarizer 420. Then, rotating the polarizer 420 at fixed speed, to polarize the light coming from the light bulb 410, and to change the polarization angle of that light, hereby reconstructing the holographic image of the target object taken at various angles.

As shown in FIG. 4(a), when the polarization angle of the polarized light is at 1°, the polarized light is irradiated onto the left side of the object image recorded. As shown in FIG. 4(b), when the polarization angle of the polarized light is at 2°, the polarized light is irradiated onto the right side of the object image recorded. As shown in FIG. 4(c), at position L1, it indicates that when the polarization angle of the polarized light is at 1°, the polarized light is irradiated onto the left side of the object image recorded; at position R2, it indicates that when the polarization angle of the polarized light is at 2°, the polarized light is irradiated onto the right side of the object image recorded; and at position L3, it indicates that when the polarization angle of the polarized light is at 3°, the polarized light is irradiated onto the left side of the object image recorded.

As such, along with the rotation of the polarizer 420, the polarization angle of the polarized light is varied, until all the images of 360 degrees taken for the target object are reconstructed, hereby completing reconstruction of all the holographic images of the target object. When the rotation speed of the polarizer 420 is increased to over 42 Hz, due to the vision persistence of a human eye, that could make the object images taken at various angles to remain in the brain of a viewer at the same time, so that the reconstructed holographic image appears to be enlarged and floating over the holographic film. The viewer's brain will perceive the reconstructed 2D image as a 3D holographic image, thus completing reconstruction of the holographic images.

Figure 5:
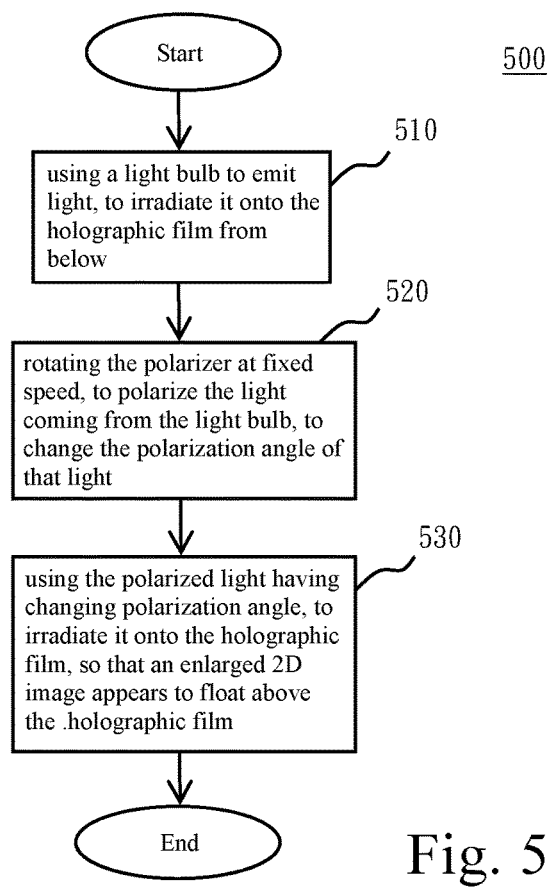
FIG. 5 is a flowchart of the steps of a holographic image reconstructing method according to an embodiment of the present invention.

Refer to FIG. 5 for a flowchart of the steps of a holographic image reconstructing method according to an embodiment of the present invention. As shown in FIG. 5, the holographic image reconstructing method is realized through using as holographic image reconstructing device, including: a light bulb 410 and a polarizer 420. The polarizer 420 is disposed between the light bulb 410 and a holographic film 430, while on the holographic film 430 is provided with the recorded holographic images. The holographic image reconstructing method 500 includes the following steps: firstly, using the light bulb 410 to emit light to irradiate it onto the holographic film 430 from below after passing through the polarizer 420 (step 510). Next, rotating the polarizer 420 at fixed speed, to polarize the light coming from the light bulb 410, and to change the polarization angle of that light (step 520), Then, using the polarized light having changed polarization angle, to irradiate it onto the holographic film to reconstruct the holographic images of the object taken at various angles, so that an enlarged 2D image appear floating above the holographic film 430 (step 530). Due to the vision persistence effect of human eyes, the enlarged and floating 2D image could be perceived in the viewer's brain as a 3D holographic image for the target object taken at various angles.

In the descriptions above, the polarizer 420 can be driven by a motor (not shown), to rotate 360° at fixed speed. The light bulb 410 can be an LED lamp or an incandescent lamp.

Summing up the above, in the present invention, a polarizer is used in the image recording and reconstructing path, to overcome the drawbacks and shortcomings of the prior art, in achieving the following advantages, thus it does have application values in the Industries.

The characteristics and advantages of the present invention are that, it utilizes an object light and a reference light of the same polarization angle, to irradiate it onto a holographic film at the same time, to produce holographic film of small size (less than 1 cm×1 cm). In addition, in the present invention, since polarizer is used in the image recording and reconstructing path, the cylinder lens used in the conventional disc type composite hologram can be eliminated, so that image distortion can be avoided, while grating effect will not occur. Further, in image reconstruction, enlarged and floating 2D images could appear at higher altitude for all the images taken at 360 degrees, and are perceived as 3D holographic images by the viewers around.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A holographic image recording method, that is realized through utilizing a holographic image fetching and recording device, including a holographic image fetching device, that includes an image fetching device and a rotation table; and a holographic image recording device, that includes: a light emitting unit, a first reflector, a light splitter, a first polarizer, a second reflector, a display panel, a holographic film, a second polarizer, and a third reflector;

the holographic image recording method includes the following steps:

using the image fetching device itself remaining fixed, to fetch an image of a target object placed on a rotation table rotating at a fixed speed, the image thus obtained is transmitted to the display panel through a connection line;

using a light emitting unit, to emit a coherent light to a first reflector;

the first reflector receives the coherent light and reflects it to the light splitter;

the light splitter reflects the coherent light along a second light path to the second polarizer, to form into a reference light;

the second polarizer polarizes the coherent light into a polarized light, and transmits it to the third reflector;

the third reflector reflects the polarized light onto the holographic film along the second light path;

the light splitter transmits the coherent light along the first light path to the first polarizer, to form into an object light;

the first polarizer polarizes the coherent light into a polarized light, and transmits it to the second reflector;

the second reflector reflects the polarized light onto the display panel along the first light path, and then transmits the polarized light through the display panel, with the polarized light carrying the image information on the display panel, to impinge onto the holographic film; and the object light coming from the first light path, and the reference light coming from the second light path interfere with each other on the holographic film, to form a holographic image, wherein the first polarizer and the second polarizer are driven by a step motor, to rotate 360 degrees synchronously at a same speed.

2. The holographic image recording method as claimed in claim 1, wherein the first light path and the second light path have a same length.

3. The holographic image recording method as claimed in claim 1, wherein the rotation table is driven by a step motor, to rotate 360°.

4. The holographic image recording method as claimed in claim 1, wherein the image fetching device is a charge-coupled device (CCD) camera.

5. The holographic image recording method as claimed in claim 1, wherein the display panel is a liquid crystal display panel.

* * * * *